(12) United States Patent
Yang et al.

(10) Patent No.: US 11,535,768 B2
(45) Date of Patent: Dec. 27, 2022

(54) AQUEOUS COATING COMPOSITIONS FOR FORMING ANTI-GRAIN-PUFFING COATINGS ON WOOD SUBSTRATE, AQUEOUS PAINTS AND ARTICLES

(71) Applicant: GUANGDONG HUARUN PAINTS CO., LTD, Foshan (CN)

(72) Inventors: Wei Yang, Shanghai (CN); Jiahua Ke, Jinjiang (CN)

(73) Assignee: GUANGDONG HUARUN PAINTS CO., LTD

( * ) Notice: Subject to any disclaimer, the term of this patent is extended or adjusted under 35 U.S.C. 154(b) by 108 days.

(21) Appl. No.: 15/733,129

(22) PCT Filed: Dec. 7, 2018

(86) PCT No.: PCT/US2018/064391
§ 371 (c)(1),
(2) Date: May 22, 2020

(87) PCT Pub. No.: WO2019/113402
PCT Pub. Date: Jun. 13, 2019

(65) Prior Publication Data
US 2020/0369905 A1    Nov. 26, 2020

(30) Foreign Application Priority Data

Dec. 7, 2017  (CN) .......................... 201711286763.7

(51) Int. Cl.
| | | |
|---|---|---|
| C09D 15/00 | (2006.01) | |
| C09D 7/61 | (2018.01) | |
| C09D 7/40 | (2018.01) | |
| C09D 5/02 | (2006.01) | |
| C09D 133/04 | (2006.01) | |
| C09D 175/06 | (2006.01) | |
| C08K 3/36 | (2006.01) | |

(52) U.S. Cl.
CPC ............ C09D 15/00 (2013.01); C09D 5/024 (2013.01); C09D 7/61 (2018.01); C09D 7/67 (2018.01); C09D 133/04 (2013.01); C09D 175/06 (2013.01); C08K 3/36 (2013.01); C08K 2201/011 (2013.01)

(58) Field of Classification Search
CPC .......... C09D 15/00; C09D 5/024; C09D 7/67;
C09D 133/04; C09D 175/06; C09D 7/61;
C08K 3/36
USPC ........................................................ 524/560
See application file for complete search history.

(56) References Cited

U.S. PATENT DOCUMENTS

2015/0152282 A1*  6/2015  Wang ................... C09D 131/04
524/521

FOREIGN PATENT DOCUMENTS

| CN | 103897571 | 7/2014 |
|---|---|---|
| CN | 105273539 | 1/2016 |
| CN | 105482586 | 4/2016 |
| WO | 2013181793 | 12/2013 |

OTHER PUBLICATIONS

Written Opinion for international patent application No. PCT/US2018/064391, dated Feb. 28, 2019 (4 pages).
International Search Report for international patent application No. PCT/US2018/064391, dated Feb. 28, 2019 (2 pages).
Office Action issued for Chinese Patent Application No. 2017112867637, dated Apr. 27, 2021, 5 pages (including English summary of substantive portion of Office Action).
Office Action issued for Chinese Patent Application No. 2017112867637, dated Sep. 10, 2020, 7 pages (including English summary of substantive portion of Office Action).

* cited by examiner

*Primary Examiner* — Hui H Chin

(57) ABSTRACT

The present invention relates to aqueous coating compositions for forming an anti-grain-puffing coating, aqueous primers comprising the aqueous coating composition, and articles comprising the anti-grain-puffing coating. In particular, the aqueous coating composition comprises: (a) an aqueous dispersion of polymeric particles, wherein the polymer particles comprise polymer having an anionic hydrophilic group on its molecule chain, and the aqueous dispersion of polymeric particles has a pH of less than 7.0; and (b) an aqueous dispersion of nano-silica.

11 Claims, 2 Drawing Sheets

AQUEOUS COATING COMPOSITIONS FOR FORMING ANTI-GRAIN-PUFFING COATINGS ON WOOD SUBSTRATE, AQUEOUS PAINTS AND ARTICLES

This application claims the benefit of Chinese application number CN201711286763.7 filed on Dec. 7, 2017, the entirety of which is hereby incorporated by reference.

TECHNICAL FIELD

The present invention relates to an aqueous coating composition and an aqueous paint formulated therefrom. In particular, the present invention relates to an aqueous coating composition for forming an anti-grain-puffing coating on a wood substrate, and an aqueous paint formulated therefrom, comprising a one-part aqueous primer and a two-part aqueous primer. The present invention also relates to an article comprising the anti-grain-puffing coating.

BACKGROUND

Waterborne paints usually contain water instead of organic solvents as a diluent medium, the production, storage and use of which would necessarily reduce the release of organic solvents into the environment, avoid environmental pollution and harm to the construction workers, and also save resources. Thus, with the increasingly stringent environmental laws and regulations in various countries in the world, waterborne coatings have become the main direction for the development of coatings industry. The use of waterborne wood coatings may not only meet the sustainable development of energy-saving emission reduction requirements, but also reduce indoor pollution. Therefore, development of high-performance waterborne coatings have become a key point in the coatings industry.

Wood products, including wood furniture are the most commonly used products in industry and life, which are mainly made of wood substrate with a capillary porous structure on the surface thereof. Before painting, in order to achieve a smooth surface, it is usually necessary to polish the wood substrate first. However, this procedure inevitably results in the presence of a large amount of loosely bound wood fibers on the surface of the wood substrate. When the treated substrate is applied with waterborne wood lacquer, water easily penetrates into capillaries of the substrate, causing the capillaries to swell, and the loosely bound fibers will protrude over the treated surface to create a bumpy coating called a "grain puffing" phenomenon. The existence of the phenomenon will significantly reduce the decorative effect of the coating.

At present, there are two main methods for reducing or eliminating the issue of "grain puffing" caused by waterborne wood lacquer. The first method is to fill and/or block the capillary on the surface of the wood substrate with inorganic particles to reduce the penetration of the aqueous medium, thereby reducing or eliminating the grain puffing of the wood substrate. The second method is to apply a cationic aqueous latex paint such as XK-350 available from DSM on the surface of the wood substrate. The cationic aqueous latex paint may react with an anionic substance such as tannin contained in the substrate to form a barrier layer, and can form a hydrogen bond with a hydroxyl group in the wood substrate to prevent moisture from entering the wood substrate, thereby reducing or eliminating the phenomenon of "grain puffing". However, such waterborne latex paint is expensive and has limited application fields.

Thus, there is still a need to an anti-grain puffing coating for improving performances of the wood substrate.

SUMMARY

In one aspect, the present invention discloses an aqueous coating composition for forming an anti-grain-puffing coating on a wood substrate, comprising: (a) an aqueous dispersion of polymeric particles, wherein the polymer particles comprise polymer having an anionic hydrophilic group on its molecule chain, and the aqueous dispersion of polymeric particles has a pH of less than 7.0; and (b) an aqueous dispersion of nano-silica. Preferably, the aqueous dispersion of polymeric particles has a pH of more than 5.0, more preferably has a pH of more than 6.0.

In another aspect, the present invention discloses a one-part aqueous primer comprising the aqueous coating composition of the present invention.

In another aspect, the present invention discloses a two-part aqueous primer, comprising: (a) the aqueous coating composition of the present invention as a film-forming resin; and (b) a blocked isocyanate.

In another aspect, the present invention discloses an article comprising: (a) a wood substrate having at least one major surface; (b) an anti-grain-puffing coating directly applied on the major surface of the wood substrate, formed from the aqueous coating composition of the present invention, or from the one-part aqueous primer or the two-part aqueous primer of the present invention; and (c) a coating applied on the anti-grain-puffing coating, formed from an aqueous coating composition. Preferably, the article of the present invention has a surface roughness that is at least 30% less than that of an article comprising a wood substrate coated with an aqueous dispersion of polymeric particles, wherein the polymer particles comprise polymer having an anionic hydrophilic group on its molecular chain and having a pH greater than 7.0.

In the present invention, the applicant have creatively provided a novel idea for solving the issue of grain puffing when coating a wood substrate by applying an aqueous coating composition comprising an aqueous dispersion of polymeric particles, especially an aqueous dispersion of acrylics particles, wherein the polymer particles comprise polymer having an anionic hydrophilic group on its molecule chain and the aqueous dispersion of polymeric particles has a pH of less than 7.0 (hereinafter referred as an anionic aqueous latex); and an aqueous dispersion of nano-silica to the surface of a wood substrate as an anti-grain-puffing coating. The formation of this anti-grain-puffing coating significantly reduces or eliminates grain puffing of the wood substrate caused by the aqueous coating composition.

In view of the stability of the system, commercially available anionic aqueous latice are generally known to be alkaline, which typically have a pH of above 7.0, preferably about 8.0 or higher. However, the inventors of the present invention have surprisingly found that use of an anionic aqueous latex having a pH of less than 7.0 in formulating an aqueous coating composition suitable for forming an anti-grain-puffing coating can produce significantly superior grain puffing resistance, compared to an anionic aqueous latex having a pH of higher than 7.0, which was difficult to anticipate prior to the present invention.

The details of one or more embodiments of the invention will be set forth in description below. The other features, objectives, and advantages of the invention will become apparent.

Definition

As used herein, "a", "an", "the", "at least one", and "one or more" are used interchangeably, unless indicated otherwise. Thus, for example, a coating composition that comprises "an" additive can be interpreted to mean that the coating composition includes "one or more" additives.

Throughout the present invention, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as long as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

When used in the context of wood substrates, the term "major surface" is a surface defined by the lengthwise and widthwise dimensions of the wood substrates for providing the decoration.

Herein, the term "surface roughness" is a parameter used for measuring the extent to which a wood substrate is penetrated by an aqueous coating composition. The smaller the surface roughness indicates that the wood substrate exhibits lower grain puffing.

The term "on" when used in the context of "a coating applied on an anti-grain-puffing coating, formed from an aqueous coating composition" includes the coating being applied directly or indirectly on the anti-grain-puffing coating. In some embodiments of the invention, the coating formed from the aqueous coating composition is applied directly to the anti-grain-puffing coating and is in direct contact with the anti-grain-puffing coating. In some embodiments of the invention, one or more layers of colorant may be present between the coating formed from the aqueous coating composition and the anti-grain-puffing coating so as to achieve the desired color.

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DRAWINGS

DETAILED DESCRIPTION

Figure 1:
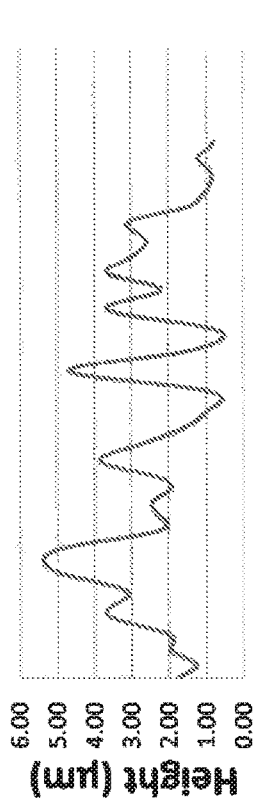
FIG. 1 shows the surface morphology of the sample which is formed by using the present aqueous coating composition as an anti-grain-puffing coating and applying an aqueous coating composition on the anti-grain-puffing coating, in which Examples 1-1 to 1-4 represent the results obtained by sampling in different areas of the sample.
Figure 1:
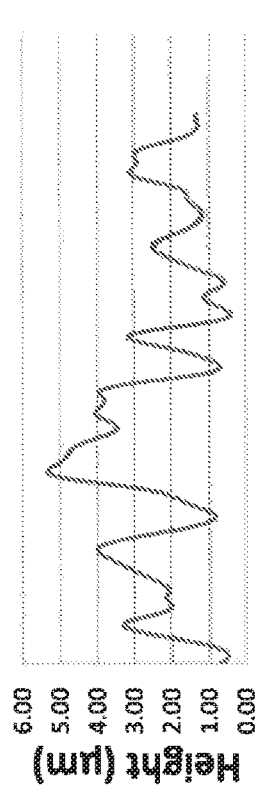
Figure 1:
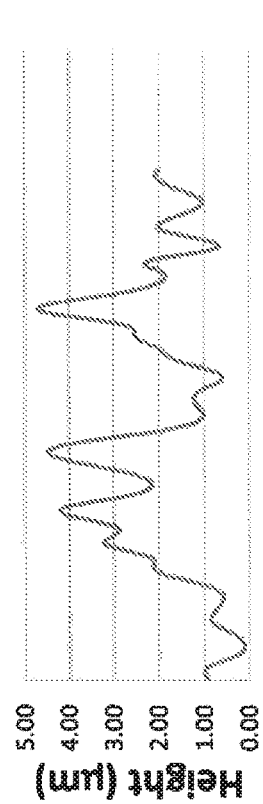
Figure 1:
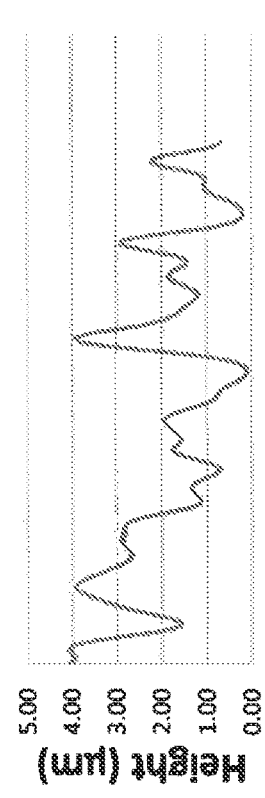

In one aspect, the present invention discloses an aqueous coating composition for forming an anti-grain-puffing coating on a wood substrate, comprising (a) an aqueous dispersion of polymeric particles, wherein the polymer particles comprise polymer having an anionic hydrophilic group on its molecule chain and the aqueous dispersion of polymeric particles has a pH of less than 7.0; and (b) an aqueous dispersion of nano-silica.

As used herein, the term "aqueous dispersion of polymeric particles" refers to a stable dispersion of synthetic resin (i.e., polymer) in the form of particulates in an aqueous liquid medium, optionally with the aid of suitable dispersing aids such as surfactants. Thus, when used in the content of polymer, the terms "aqueous dispersion of polymeric particles" and "aqueous latex" may be used interchangeably unless otherwise stated. Methods of preparing aqueous dispersions of the polymeric particles of the present invention are known in the art which can be prepared, for example, using emulsion polymerization processes known to those skilled in the art. The emulsion polymerization preparation process generally comprises the steps of dispersing polymerizable monomers in water into an emulsion under the action of a suitable emulsifier and/or a dispersing stabilizer by means of stirring, and for example initiating polymerization of the monomers by adding an initiator. In the present invention, the polymeric particles may be modified by, for example, modification of an organic functional group including but not limited to a carboxyl group, a hydroxyl group, an amino group, an isocyanate group, a sulfonic acid group, etc. to obtain an aqueous latex with desired properties, for example dispersing properties. Thus, in the present invention, the term "aqueous latex" includes not only a dispersion of unmodified polymeric particles in an aqueous medium, but also a dispersion of organic functional groups-modified polymeric particles in an aqueous medium.

In the aqueous coating composition according to the invention, the aqueous dispersion of polymeric particles used has a pH of less than 7.0. Preferably, the aqueous dispersion of polymeric particles has a pH greater than 5.0, more preferably greater than 6.0. In a preferred embodiment of the invention, the aqueous dispersion of polymeric particles has a pH in the range of 6.2-6.8.

In the aqueous coating composition according to the present invention, the polymer contained in the polymeric particles of the aqueous dispersion has one or more anionic hydrophilic groups on the molecular chain, and thus the aqueous dispersion of such polymeric particles is also known as an anionic aqueous latex in the present invention. In some embodiments of the invention, the anionic hydrophilic group can be in the form of an acid, such as a carboxylic acid group, a sulfonic acid group, a phosphate group, a phosphonic acid group, a phosphinic acid group, and the like. Additionally, a portion of the anionic hydrophilic group of the anionic aqueous latex may be in the form of an acid salt, such as a neutralized acid or anhydride, for achieving a suitable stability. Examples of suitable anionic hydrophilic groups in the form of acid salts include carboxylate ($—CO_2^-$), sulfate, phosphate, sulfonate, phosphite, phosphonate, and combinations thereof. In a preferred embodiment of the present invention, the anionic hydrophilic group comprises not only an anionic hydrophilic group in the form of an acid but also an anionic hydrophilic group in the form of an acid salt.

The inventors of the present invention have surprisingly found that use of an anionic aqueous latex having a pH of less than 7.0 in formulating an aqueous coating composition suitable for forming an anti-grain-puffing coating may produce significantly superior grain puffing resistance, compared to an anionic aqueous latex having a pH of higher than 7.0.

In the aqueous coating composition according to the present invention, the aqueous dispersion of the polymeric particles used may also have a certain hydroxyl value, and thus the aqueous coating composition according to the present invention may be combined with a hydroxyl reactive curing agent to form a two parts system. In one embodiment of the present invention, the aqueous dispersion of polymeric particles has a hydroxyl number of from 0 to 100 mg KOH/g, preferably a hydroxyl number of from 20 to 80 mg KOH/g.

In the aqueous coating composition according to the invention, the aqueous dispersion of polymeric particles comprises polymeric particles having a certain particle size. Preferably, the polymeric particles have such a small particle size that they can block or fill into the capillaries of the wood substrate, thereby reducing or inhibiting the intake of moisture. The size of the polymeric particles can be measured by a Z-average particle size known in the art, which refers to the particle size as determined by dynamic light scattering, for example, using a Marvlen Zetasizer 3000HS microparticle size analyzer. In one embodiment of the invention, the aqueous dispersion of polymeric particles comprises polymer particles having a particle size of less than 100 nm, preferably comprising polymer particles having a particle size of less than 80 nm. Moreover, the polymeric particles have a particle size greater than 20 nm, more preferably greater than 30 nm. In a specific embodiment of the invention, the polymeric particles have a particle size between 40 and 70 nm. It has been observed that the aqueous dispersion comprising polymeric particles having the above particle size range allows the polymeric particles to readily penetrate into the texture and block the pores of the wood substrate, thereby reducing the grain puffing of the wood substrate. If the particle size is too small, the polymer cannot effectively block the texture and/or pores of the wood substrate, and if the particle size is too large, it cannot enter the pores of the wood substrate, and thus cannot prevent grain puffing.

According to the present invention, the aqueous dispersion of polymeric particles can be an aqueous dispersion of any type of polymeric particles, including aqueous dispersions of silicones, aqueous dispersions of styrene-acrylates, aqueous dispersions of acrylates, aqueous dispersion of organic silicone modified acrylates, aqueous dispersion of vinyl acetate, aqueous dispersion of vinyl acetate-acrylates, aqueous dispersion of vinyl acetate ethylene, aqueous dispersion of ethylene vinyl acetate, aqueous dispersion of vinyl acetate-acrylate-ester of versatic acid, or a combination thereof. In a preferred embodiment of the invention, the aqueous dispersion of polymeric particles is an aqueous dispersion of acrylates.

As noted above, the anionic aqueous latexes having a pH of less than 7.0 can be prepared by suitable emulsion polymerization methods well known to those skilled in the art. Alternatively, it may be commercially available, such as DSM latex XK-102.

Preferably, the aqueous coating composition of the present invention comprises from about 70% to about 90% by weight of the above aqueous latex based on the total weight of the aqueous coating composition. More preferably, the amount of the aqueous latex may be from about 71% by weight, about 72% by weight, about 75% by weight to about 90% by weight, about 88% by weight, about 85% by weight based on the total weight of the aqueous coating composition. Furthermore, if additional water is added during the preparation of the aqueous coating composition, the amount of additional water, together with the water present in the aqueous latex of the acrylics polymer, should be included in the total weight of the aqueous latex. In the present invention, the anionic aqueous latex has a solid content of 30-50%.

The aqueous coating composition according to the present invention further comprises an aqueous dispersion of nano-silica. When used herein in the content of "aqueous dispersion of nano-silica", "nano-silica" refers to nano-sized silica that is substantially insoluble in the aqueous dispersing medium at the temperature of interest but is dispersed therein in a finely dispersed form. The nano-silica may be a solid having a nano-sized spherical, fibrous, sheet or other regular or irregular shape.

According to the invention, the nano-silica has a particle size of from 5 to 100 nm, preferably of less than 80 nm.

The inventors of the present invention have found that the aqueous dispersion of nano-silica can be a useful aider to the anionic aqueous latex having a pH of less than 7.0. Upon forming an anti-grain-puffing coating on the wooden substrate, the nano-silica in the aqueous coating composition is filled into the capillary of the wood substrate, effectively sealing the capillary of the wood, thereby further improving the anti-grain-puffing effect of the aqueous coating composition.

Preferably, the aqueous coating composition of the present invention comprises from about 0.1 to about 10% by weight, based on the total weight of the aqueous coating composition, of the above-described aqueous dispersion of nanosilica. More preferably, the amount of the aqueous dispersion of nanosilica may be from about 1% by weight, about 2% by weight and about 5% by weight to about 10% by weight, and about 9% by weight and about 8% by weight based on the total weight of the aqueous coating composition.

The present aqueous coating composition may optionally include additional additives for an aqueous coating composition which do not adversely affect the coating composition or a resultant coating obtained therefrom. Suitable additives include, for example, those that improve the processability or manufacturability of the composition, enhance composition aesthetics, or improve a particular functional property or characteristic of the coating composition or the cured composition resulting therefrom, such as adhesion to a substrate. Additives that may be included are, for example, carriers, emulsifiers, pigments, anti-migration aids, anti-microbials, extenders, lubricants, wetting agents, biocides, plasticizers, antifoaming agents, colorants, waxes, anti-oxidants, anticorrosion agents, flow control agents, thixotropic agents, dispersants, adhesion promoters, UV stabilizers, a thickener, a defoamer, a pH adjuster, a silane coupling agent, a high boiling film forming agent, or combinations thereof. Each optional ingredient can be included in a sufficient amount to serve its intended purpose, but preferably not in such an amount to adversely affect a coating composition or a cured coating resulting therefrom.

In an embodiment according to the present invention, the aqueous coating composition of the present invention comprises 70 to 90% by weight of the aqueous dispersion of polymeric particles, 0.1 to 10 wt % % of the aqueous dispersion of nanosilica; and 0-29.9 wt % of additional additives relative to the total weight of the aqueous coating composition.

The inventors of the present invention have also surprisingly found that the aqueous coating composition of the present invention has an excellent sealing effect. After further applying an aqueous coating composition to the anti-grain-puffing coating formed from the aqueous coating composition of the present invention, the resulting article has an acceptable surface roughness, which is significantly lower than that of the article with an anionic aqueous latex having a pH greater than 7.0. In one embodiment of the present invention, the article prepared by sealing the wood substrate with the present aqueous coating composition followed by applying an aqueous coating composition has a surface roughness that is 30% or more, preferably 40% or more, more preferably 50% or more less than the article prepared by sealing the wood substrate with an anionic aqueous latex having pH more than 7.0 followed by applying an aqueous coating composition In the present invention, the aqueous coating composition can be used as it is, which is applied to a substrate to form a coating, preferably as a primer layer in direct contact with the substrate. Accordingly, the present invention is also directed to a one-part aqueous primer comprising the aqueous coating composition of the present invention.

In the present invention, the aqueous coating composition may also be combined with a hydroxyl reactive curing agent to form a two-parts coating system that is applied to a substrate to form a coating, preferably as a primer layer in direct contact with the substrate. Accordingly, the present invention in another aspect discloses a two-parts aqueous primer comprising (a) the aqueous coating composition of the present invention as a film-forming resin component; and (b) a blocked polyisocyanate curing agent.

According to the invention, the blocked isocyanate means an isocyanate that is blocked by an active hydrogen-containing material, including a blocked aliphatic polyisocyanate, a blocked cycloaliphatic polyisocyanate, a blocked aromatic polyisocyanate or combinations thereof.

Non-limiting examples of blocked isocyanates include blocked aliphatic and/or cycloaliphatic polyisocyanates such as HDI (hexamethylene diisocyanate), IPDI (isophorone diisocyanate), TMXDI (di[isocyanatocyclohexyl] methane), $H_{12}MDI$ (tetramethylene-m-xylylene diisocyanate), TMI (isopropenyldimethylbenzyl isocyanate) and dimers or trimers thereof; and blocked aromatic polyisocyanates such as p-phenylene diisocyanate, toluene-2,4-diisocyanate, naphthalene-1,4-diisocyanate, biphenyl-4,4'-diisocyanate, benzene-1,2,4-triisocyanate, xylene-1,4-diisocyanate, xylene-1,3-diisocyanate, diphenylmethane diisocyanate. Suitable blocking agents include, for example, phenols such as phenol, m-nitrophenol, p-chlorophenol, catechol; malonates such as diethyl malonate, acetylacetone, ethyl acetoacetate; other blocking agents, such as n-butanone oxime, ε-caprolactam and secondary amines.

The blocked isocyanate may have a suitable molecular weight as needed. In some embodiments, the blocked isocyanate that can be used has an Mn of at least about 300, more preferably at least about 650, and even more preferably at least about 1000.

The blocked isocyanates are commercially available, and non-limiting examples of suitable commercially available blocked isocyanates include VESTANAT B 1358 A, VESTANAT EP B 1186 A, VESTANA EP B 1299 SV (from Degussa Corp., Marl, Germany); and DESMODUR VPLS 2078 and DESMODURBL L3175SN (available from Bayer AG, Leverkusen, Germany).

Preferably, in the two-parts aqueous primer of the present invention, the amount of the blocked polyisocyanate curing agent is generally dependent upon the film forming resin component and can be determined empirically.

In another aspect, the present invention discloses an article, comprising (a) a wood substrate having at least one major surface; (b) an anti-grain-puffing coating directly applied on the major surface of the wood substrate, formed from the aqueous coating composition of the present invention, or from the one part aqueous primer or the two parts aqueous primer of the present invention; and (c) a coating applied on the anti-grain-puffing coating, formed from an aqueous coating composition.

As the wood substrate used to make the article of the present invention, any suitable wood substrate known in the art can be used. According to the invention, the wood substrate has at least one, preferably two, major surfaces that are opposite one another. As used herein, "major surface" is a surface defined by the lengthwise and widthwise dimensions of the wood substrate for providing the decoration.

Preferably, the major surface of the wood substrate may contain polar groups such as hydroxyl groups, amino groups, mercapto groups, etc., so that the anionic aqueous latex having pH of less than 7.0 contained in the aqueous coating composition according to the present invention can easily wet the major surface when it is applied thereto, thereby forming a coating. Methods for obtaining a wood substrate having a major surface with hydroxyl groups are known in the art. Specifically, the hydroxyl group may be introduced on the surface of the wood substrate by performing surface treatment on the major surface of the wood substrate, for example, by corona treatment.

According to the present invention, the wood substrate comprises a soft wood substrate, a hard wood substrate or a combination thereof. As an example of a soft wood substrate, pine, cedar or fir can be used. As an example of a hard wood substrate, ashtree, white ash, basswood, elm, maple, birch, alder, beech, oak, rubber wood, cherry, walnut, or rosewood can be used. In one embodiment of the present invention, solid oak board is used as the wood substrate.

According to the invention, the aqueous coating composition can be applied by customary application processes known to a person skilled in the art. The application processes comprise dip coating, spin coating, spray coating, curtain coating, brush coating, roll coating, and other coating methods known in the art. In one embodiment of the present invention, application is carried out by spray coating.

In the article according to the present invention, one or more coatings formed from an aqueous coating composition may be applied to the surface of the anti-grain-puffing coating. According to the present invention, the coating may comprise a primer coating, an intermediate coating, a topcoat coating, or a combination thereof. The coating can be applied directly to the anti-grain-puffing coating and is in contact with the anti-grain-puffing coating. In some embodiments of the invention, one or more colorant layers may be present between the coating formed from the aqueous coating composition and the anti-grain-puffing coating so as to achieve the desired color.

According to the present invention, two or more coatings formed from the aqueous coating composition may be applied to the anti-grain-puffing coating, preferably three or more coatings formed from the aqueous coating composition, and more preferably, 4 or more coatings formed from the aqueous coating composition without affecting the barrier effect of the anti-grain-puffing coating.

According to the present invention, the aqueous coating composition may be any aqueous coating composition known to those skilled in the art that is suitable for coating wood substrates. In one embodiment of the invention, the aqueous coating composition is a water-soluble coating, preferably comprising polyvinyl alcohol as the film-forming resin. In another embodiment of the present invention, the aqueous coating composition is a water-dispersible coating, preferably comprising a film-forming resin including, but not limited to, an aqueous dispersion of organic silicone, an aqueous dispersion of styrene-acrylate, an aqueous dispersion of acrylates, an aqueous dispersion of organic silicone-modified acrylate, an aqueous dispersion of vinyl acetate, an aqueous dispersion of vinyl acetate-acrylate, an aqueous dispersion of vinyl acetate-ethylene, an aqueous dispersion of vinyl acetate-acrylate-esters of versatic acid, an aqueous dispersion of polyurethane, an aqueous dispersion of acrylate-polyurethane or any combination thereof.

The aqueous coating composition of the present invention may further comprise one or more fillers. As used herein, the term, "filler", is intended to refer to any coating volume extender, either organic or inorganic, in the form of e.g., particles or powders. There is no particular limitation on the shape of particles, and the filler may have any suitable shape. The particle size of the filler may vary over a broad range, e.g., from about 10 nanometers to about 50 micrometers. In addition to functioning as a coating volume extender, some fillers may impart one or more desired properties to the composition and/or coating resulted from the composition. For example, some fillers may impart desired color to the composition and hence the coating resulted from the composition, and in this case such fillers may be also referred to as "pigment". Some fillers may improve chemical and/or physical properties, in particular mechanical properties of the coating resulted from the composition, and in this case they may also be referred to as "enforcing additive".

The present aqueous coating composition may optionally include additional additives for an aqueous coating composition which do not adversely affect the coating composition or a resultant coating obtained therefrom. Suitable additives include, for example, those that improve the processability or manufacturability of the composition, enhance composition aesthetics, or improve a particular functional property or characteristic of the coating composition or the cured composition resulting therefrom, such as adhesion to a substrate. Additives that may be included are, for example, carriers, emulsifiers, pigments, anti-migration aids, anti-microbials, extenders, lubricants, wetting agents, biocides, plasticizers, antifoaming agents, colorants, waxes, anti-oxidants, anticorrosion agents, flow control agents, thixotropic agents, dispersants, adhesion promoters, UV stabilizers, a thickener, a defoamer, a pH adjuster, a silane coupling agent, a high boiling film forming agent, or combinations thereof. Each optional ingredient can be included in a sufficient amount to serve its intended purpose, but preferably not in such an amount to adversely affect a coating composition or a cured coating resulting therefrom.

According to the present invention, the preparation of the aqueous coating composition can be accomplished using any suitable method known to one of ordinary skill in the art. For example, the aqueous coating composition can be made by adding all of the components to a container and then stirring the resulting mixture until homogeneous. Alternatively, the aqueous coating composition can be made by first mixing some of the components and then adding the rest of the other components to form a homogeneous mixture. Alternatively, any suitable commercially available aqueous coating composition may be used, such as an acrylic aqueous sealant and/or varnish from Valspar (China), such as 470C4015K, 481C54086K.

According to the present invention, the aqueous coating composition can be applied by conventional application processes known to those skilled in the art. The application processes include dip coating, spin coating, spray coating, curtain coating, brush coating, roll coating, and other application processes known in the art. According to the present invention, a wet on dry application process is applied. Typically, an aqueous liquid medium comprising water and any co-solvent is removed by natural or accelerated (heat) drying to form a coating.

According to the present invention, the article can be prepared, for example, by (1) providing a milled wooden substrate; (2) applying an aqueous coating composition of the present invention to the wood substrate using a spray coating process, thereby forming an anti-grain-puffing coating; and (3) sequentially applying one or more desired coatings formed from the aqueous coating composition to the anti-grain-puffing coating using a wet-on-dry coating process. Optionally, the colorant may be coated on the anti-grain-puffing coating prior to step (3) so as to provide the wood substrate with the desired color.

According to the present invention, the articles thus obtained may be used for applications including, but not limited to, household furniture such as tables, chairs, cabinets and the like; bedroom and bathroom furniture; office furniture; custom furniture such as school and children's furniture, hospital furniture, restaurant and hotel furniture, kitchen cabinets and furniture; interior design panels; indoor and outdoor windows and doors; indoor and outdoor window and door frames; outdoor and indoor wall panels and wood floors.

The following examples describe the present invention in more detail, which are for illustrative purposes only, since various modifications and changes will be apparent to those skilled in the art from the scope of the present invention. Unless otherwise indicated, all parts, percentages, and ratios reported in the following examples are on a weight basis and all reagents used in the examples are commercially available and may be used without further treatment.

EXAMPLES

Treatment of Wood Substrates

Oak wood boards commercial available from the timber market were dried. A sample of size 15 cm*15 cm*1.5 cm was taken from the dried board and conditioned at a temperature of 25° C. and a relative humidity (RH) of 60% with an air flow rate of 1.8 m/s to constant, where the equilibrium moisture content of the sample was 11%. A strip sander was used to polish the sample by using a sandpaper purchased from 3MT Utility Cloth Sheet 240 and then the polished sample was cleaned with a pressure gun.

Comparative Examples

An aqueous coating composition was prepared for control. The aqueous latex was separately mixed with the aqueous dispersion of nanosilica in parts by weight shown in Table 1 below to form an aqueous coating composition for control as an aqueous blocking agent. Comparative Example A used R-9029 from DSM, which is an aqueous polyurethane dispersion having a pH of 7.2-8.5; Comparative Example B used AC-122, which is an aqueous acrylics dispersion with a pH of 8.5; Comparative Example C used CUR995, which is an aqueous polyurethane dispersion with a pH of 7-8.

Then, above various aqueous sealing agents were sprayed on the treated samples, and dried in air for 15 minutes, in an oven at 40° C. for 1 hour, then cooled in air for 30 minutes. The obtained samples were polished by using 3MT Wetordry™ Sheet 240 sandpaper. Next, the acrylic varnish 481C54086K supplied by Valspar was sprayed twice, and after each coating, the sample was air-dried for 10 minutes, in an oven at 40° C. for 1 hour, then taken out of the oven, and kept at room temperature for 48 hours. Then, the effect of the grain puffing was measured by an optical microscope.

Example 1

The aqueous coating composition of the present invention was formulated as below. The aqueous acrylics latex DSM XK-102 from DSM was mixed with the aqueous dispersion of nanosilica in parts by weight as shown in Table 1 below to form the aqueous coating composition of the present invention. The aqueous acrylics latex DSM XK-102 used in the present invention is an anionic aqueous latex having an anionic hydrophilic group in a molecular chain and has a pH of 6.2 to 6.8.

The aqueous coating composition of the present invention was then sprayed onto the treated sample and dried in air for 15 minutes, in an oven at 40° C. for 1 hour, then cooled in air for 30 minutes. The obtained samples were polished by using 3MT Wetordry™ Sheet 240 Sandpaper. Next, the acrylic varnish 481C54086K supplied by Valspar was sprayed twice, and after each coating, the sample was air-dried for 10 minutes, in an oven at 40° C. for 1 hour, then taken out of the oven, and kept at room temperature for 48 hours. The effect of the grain puffing was then measured using an optical microscope.

Table 1 below summarizes the composition and the grain puffing effect of the aqueous coating composition of the present invention and the aqueous blocking agents used for the control.

TABLE 1

|  | Ex1 | CExA | CExB | CExC |
|---|---|---|---|---|
| DSM XK-102 | 83% | | | |
| DSM R-9029 | | 83% | | |
| AC-122 | | | 83% | |
| CUR995 | | | | 83% |
| WV 33 WB Ludox | 10% | 10% | 10% | 10% |
| Additional additives | 7% | 7% | 7% | 7% |
| Total | 100% | 100% | 100% | 100% |
| Grain puffing | NO | Slight | slight | medium |

It can be seen from the visual results that the anionic aqueous latex having a lower pH (such as XK-102) is a key factor for achieving an anti-grain-puffing effect. In contrast, those aqueous sealing agents formed by using other aqueous latice having a pH greater than 7.0 have an unanticipated effect.

Surface Roughness

In order to further verify the anti-grain-puffing effect of the aqueous coating composition of the present invention, the aqueous coating composition of Example 1 of the present invention and the conventional aqueous sealing agent WTD7500 containing an anionic aqueous latex having a pH greater than 7.0 were respectively formed into an anti-grain-puffing coating, which were applied in the same manner as in the above Example 1 to form a sample to be tested.

The surface of the sample was imaged in a dark field mode by an optical microscope. The microscope used was a Keyence VHX-5000 with a Z1000 lens. The roughness parameters defined by ISO Standard 25178 were calculated from the height distribution in a small area of size 5 mm*5 mm and averaged. Before calculating the surface roughness, the slope and shape of the image were calibrate by fitting a 2-level polynomial.

Figure 2:
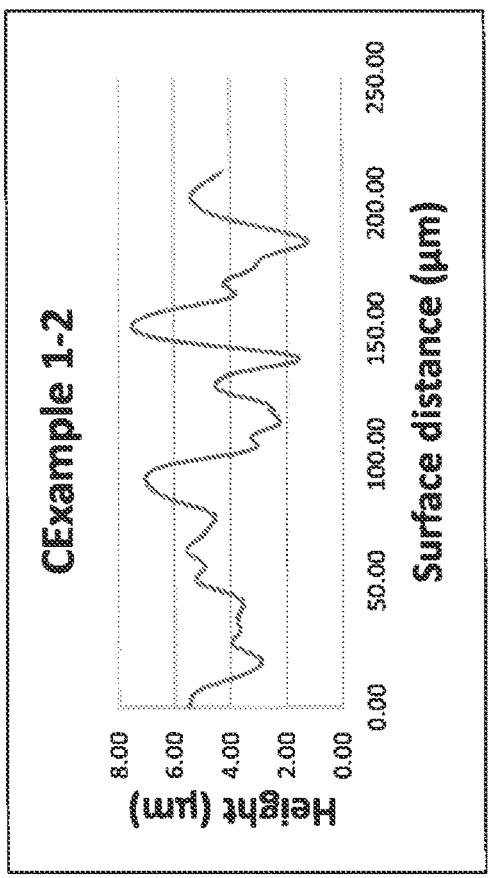
FIG. 2 shows the surface morphology of the comparative sample which is formed by using an anionic aqueous latex having a pH of more than 7.0 as an anti-grain-puffing coating and applying an aqueous coating composition on the anti-grain-puffing coating, in which CExamples 1-1 to 1-4 represent the results obtained by sampling in different areas of the comparative sample.
Figure 2:
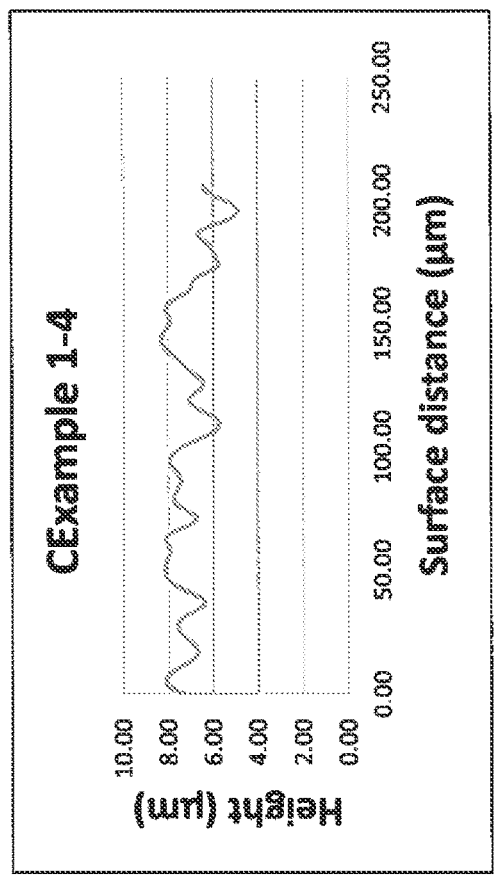
Figure 2:
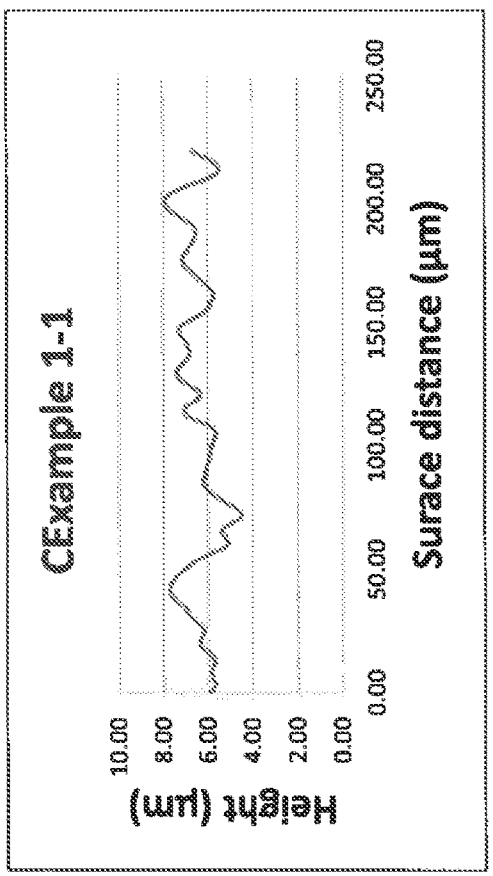
Figure 2:
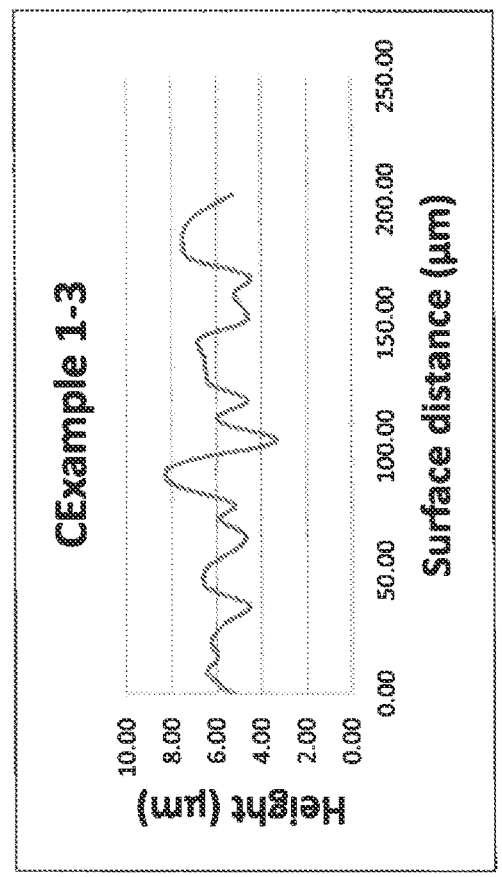

The results of surface roughness were shown in FIGS. 1 and 2.

It can be seen from the results of the surface roughness that the articles of the present invention have significantly lower surface roughness (up to 5.4 microns), compared to the comparative sample with an anionic aqueous latex having a pH of more than 7.0 as an anti-grain-puffing coating with a surface roughness of up to 8.0 microns.

Although the present invention has been described with reference to numerous embodiments and examples, those of ordinary skill in the art will recognize from the present invention that other embodiments can be devised without departing from the scope and spirit of the invention.

What is claimed is:

1. An aqueous coating composition for forming an anti-grain-puffing coating on a wood substrate, comprising:
   (a) an aqueous dispersion of polymeric particles, wherein the polymeric particles comprise polymer having an anionic hydrophilic group on its molecular chain, and the aqueous dispersion of polymeric particles has a pH of less than 7.0; and
   (b) an aqueous dispersion of nano-silica.

2. The aqueous coating composition of claim 1, wherein the aqueous dispersion of polymeric particles has a pH in the range of 6.2-6.8.

3. The aqueous coating composition of claim 1, wherein the anionic hydrophilic group is selected from a carboxylic acid group, a sulfonic acid group, a phosphonic acid group, a phosphonite group, a phosphoric acid group and the combination thereof.

4. The aqueous coating composition of claim 1, wherein the aqueous dispersion of polymeric particles has a hydroxyl value of 0-100 mg KOH/g.

5. The aqueous coating composition of claim 1, wherein the polymer particles have a particle size of less than 100 nm.

6. The aqueous coating composition of claim 1, wherein the aqueous dispersion of polymeric particles comprises an aqueous dispersion of silicone, an aqueous dispersion of styrene-acrylate, an aqueous dispersion of acrylates, an aqueous dispersion of silicone modified acrylate, an aqueous dispersion of vinyl acetate, an aqueous dispersion of vinyl acetate-acrylates, an aqueous dispersion of vinyl acetate-ethylene, an aqueous dispersion of ethylene-vinyl acetate, an aqueous dispersion of vinyl acetate-acrylates-ester of versatic acid or any combination thereof.

7. The aqueous coating composition of claim 6, wherein the aqueous dispersion of polymeric particles has a solid content of 30-50%.

8. The aqueous coating composition of claim 1, wherein the nano-silica has a particle size in the range of 5-100 nm.

9. The aqueous coating composition of claim 1 comprising, based on the total weight of the aqueous coating composition,
- 70-90 wt % of the aqueous dispersion of polymeric particles;
- 0.1-10 wt % of the aqueous dispersion of nano-silica; and
- 0-29.9 wt % of additional additives.

10. The aqueous coating composition of claim 1, wherein the coating composition is a primer for a wood substrate.

11. The aqueous coating composition of claim 4, wherein the aqueous dispersion of polymeric particles has a hydroxyl value of 20-80 mg KOH/g.

\* \* \* \* \*